United States Patent
Cha

(10) Patent No.: US 10,182,378 B2
(45) Date of Patent: Jan. 15, 2019

(54) APPARATUS AND METHOD FOR CONTROLLING HANDOVER IN WIRELESS COMMUNICATION SYSTEM

(71) Applicant: Samsung Electronics Co., Ltd., Suwon-si, Gyeonggi-do (KR)

(72) Inventor: Hwa-Jin Cha, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 489 days.

(21) Appl. No.: 14/644,690

(22) Filed: Mar. 11, 2015

(65) Prior Publication Data

US 2015/0264601 A1 Sep. 17, 2015

(30) Foreign Application Priority Data

Mar. 12, 2014 (KR) .................. 10-2014-0028988

(51) Int. Cl.
*H04W 36/00* (2009.01)
*H04W 92/04* (2009.01)

(52) U.S. Cl.
CPC ...... *H04W 36/0079* (2018.08); *H04W 92/045* (2013.01)

(58) Field of Classification Search
None
See application file for complete search history.

(56) References Cited

U.S. PATENT DOCUMENTS

| | | | | |
|---|---|---|---|---|
| 2006/0084438 A1* | 4/2006 | Kwon | ............... | H04W 36/30 455/436 |
| 2010/0034173 A1* | 2/2010 | Luo | ............... | H04W 36/30 370/332 |
| 2010/0046476 A1* | 2/2010 | Qiu | ............... | H04W 36/02 370/331 |
| 2011/0151920 A1 | 6/2011 | Oh et al. | | |
| 2011/0299465 A1* | 12/2011 | Iwamura | ............. | H04W 36/0033 370/328 |

FOREIGN PATENT DOCUMENTS

| | | |
|---|---|---|
| CN | 101299876 A | 11/2008 |
| CN | 101516089 A | 8/2009 |
| CN | 102378282 A | 3/2012 |
| CN | 102598786 A | 7/2012 |

OTHER PUBLICATIONS machine translation-Yuk_WO2013191461 A1_pub.date-12-27-13.pdf.*
machine_translation-Peng_Switching Method and System_CN101516089(A)_pub.date_08-26-2009.pdf.*

* cited by examiner

*Primary Examiner* — Jinsong Hu
*Assistant Examiner* — Alexander J Yi
(74) *Attorney, Agent, or Firm* — Jefferson IP Law, LLP

(57) ABSTRACT

A method and an apparatus for controlling a handover in a wireless communication system are provided. The method of operating an eNodeB (eNB) for controlling the handover of terminal in the wireless communication system includes receiving, by the eNB, a message indicating a link connection failure between a neighboring eNB and a Mobile Management Entity (MME), and restricting an execution of a handover based on a link connection between the neighboring eNB and the MME.

15 Claims, 18 Drawing Sheets

| IE/Group Name | Presence |
|---|---|
| Message Type | M |
| Served Cells To Add | |
| >Served Cell Information | M |
| >Neighbour Information | |
| >>ECGI | M |
| >>PCI | M |
| >>EARFCN | M |
| >>TAC | O |
| >>EARFCN Extension | O |
| Served Cells To Modify | |
| >Old ECGI | M |
| >Served Cell Information | M |
| >Neighbour Information | |
| >>ECGI | M |
| >>PCI | M |
| >>EARFCN | M |
| >>TAC | O |
| >>EARFCN Extension | O |
| >Deactivation Indication | O |
| Served Cells To Delete | |
| >Old ECGI | M |
| Gu Group Id To Add List | |
| >Gu Group Id | M |
| Gu Group Id To Delete List | |
| >Gu Group Id | M |
| S1 status To Update List | O ..<maxPools> |
| >Gu Group Id | |
| >>S1 status | |

| IE/Group Name | Presence | IE type and reference |
|---|---|---|
| MME code | M | OCTET STRING (1) |
| S1 link status | M | ENUMERATED (now available, temporarily not available,...) |
| Intra-MME HO prohibit time | O | ENUMERATED (1s,2s,5s,10s,20s, 60s,...) |

FIG.5

| IE/Group Name | Presence | IE type and reference |
|---|---|---|
| MME code | M | OCTET STRING (1) |
| S1 link status | M | ENUMERATED (now available, temporarily not available, ...) |
| Intra-MME HO prohibit time | O | ENUMERATED (1s, 2s, 5s, 10s, 20s, 60s, ...) |

| IE/Group Name | Presence |
|---|---|
| Message Type | M |
| Old eNB UE X2AP ID | M |
| Cause | M |
| S1 status | O |
| Criticality Diagnostics | O |

| IE/Group Name | Presence |
|---|---|
| Message Type | M |
| MME UE S1AP ID | M |
| eNB UE S1AP ID | M |
| Handover Type | M |
| Cause | M |
| Target ID | M |
| Direct Forwarding Path Availability | O |
| SRVCC HO Indication | O |
| Source to Target Transparent Container | M |
| Source to Target Transparent Container Secondary | O |
| MS Classmark 2 | C-ifSRVCCtoGERAN |
| MS Classmark 3 | C-ifSRVCCtoGERAN |
| CSG Id | O |
| Cell Access Mode | O |
| PS Service Not Available | O |
| MME relocation indicator | O |
| S1 status To Update List | 0..<maxPools> |
| >Xgu Group Id | |
| >>S1 status | |

| IE/Group Name | Presence | IE type and reference |
|---|---|---|
| MME relocation indicator | O | ENUMERATED (Requested,...) |

| IE/Group Name | Presence | IE type and reference |
|---|---|---|
| MME code | M | OCTET STRING (1) |
| S1 link status | M | ENUMERATED (now available, temporarily not available,...) |
| intra-MME HO prohibit time | O | ENUMERATED (1s, 2s, 5s, 10s, 20s, 60s,...) |

FIG.16

APPARATUS AND METHOD FOR CONTROLLING HANDOVER IN WIRELESS COMMUNICATION SYSTEM

CROSS-REFERENCE TO RELATED APPLICATION(S)

This application claims the benefit under 35 U.S.C. § 119(a) of a Korean patent application filed on Mar. 12, 2014 in the Korean Intellectual Property Office and assigned Serial number 10-2014-0028988, the entire disclosure of which is hereby incorporated by reference.

TECHNICAL FIELD

The present disclosure relates to a method and apparatus for controlling a handover according to an S1 link state in a wireless communication system.

BACKGROUND

In a wireless communication system, a terminal may register a specific Mobile Management Entity (MME) through an access process, and the terminal may receive a service via a corresponding MME in an MME pool area of the specific MME. Herein, an MME pool implies a group of unique MMEs in a Public Land Mobile Network (PLMN), and the MME pool area is an area managed by the MME pool. That is, when located inside the MME pool area, the terminal may receive a service without having to change a serving MME, and when located outside the MME pool area, the terminal must change the serving MME. For example, in a state where the terminal receives a service from a first eNodeB (eNB) and if a channel state between the terminal and the first eNB deteriorates or a movement of the terminal is detected, then the terminal may perform an X2 handover and/or an S1 handover so that the service can be provided from a neighboring second eNB.

The X2 handover implies a handover performed based on an X2 link between one eNB and another eNB in a state where the serving MME of the terminal is maintained. The S1 handover is a handover performed based on an S1 link between the eNB and the MME. When the terminal is not located outside the MME pool area, the serving MME may not be changed, and when the terminal is located outside the MME pool area, the serving MME may be changed.

As described above, the handover for supporting the service of the terminal may be performed based on the S1 link according to a situation. Therefore, upon a failure of an S1 link connection, there is a need to propose a detailed method for handling a handover using a corresponding S1 link.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for providing a handover upon a failure of an S1 link connection in a wireless communication system.

Another aspect of the present disclosure is to provide a method and apparatus for reporting an S1 link connection failure state to a neighboring eNodeB (eNB) and/or network nodes if an S1 link connection failure is detected in a wireless communication system.

Another aspect of the present disclosure is to provide a method and apparatus for providing a handover if a handover request is requested after an S1 link connection failure is detected in a wireless communication system.

Another aspect of the present disclosure is to provide a method and apparatus for restricting a handover attempt which uses an S1 link in a connection failure state during a pre-set time if an S1 link connection failure is detected in a wireless communication system.

Another aspect of the present disclosure is to provide a method and apparatus for maintaining a service by changing a serving Mobile Management Entity (MME) of a terminal from a first MME to a second MME in the same MME pool if the terminal registered to the first MME determines a first eNB as a handover target eNB in a situation where an S1 link connection failure is detected between the first eNB and the first MME.

Another aspect of the present disclosure is to provide a method and apparatus for maintaining a service by changing a handover target eNB of a terminal if the terminal registered to a first MME determines a first eNB as a handover target eNB in a situation where an S1 link connection failure is detected between the first eNB and the first MME.

In accordance with an aspect of the present disclosure, a method of operating an eNB for controlling a handover of a terminal in a wireless communication system is provided. The method includes receiving, by the eNB, a message indicating a link connection failure between a neighboring eNB and an MME, and restricting an execution of a handover based on a link connection between the neighboring eNB and the MME.

In accordance with another aspect of the present disclosure, a method of operating an MME for controlling a handover of a terminal in a wireless communication system is provided. The method includes detecting, by the MME, a link connection failure with respect to the MME and at least one eNB, and transmitting, to at least one different eNB connected to the MME, a message indicating a link connection failure between the MME and the at least one eNB.

In accordance with another aspect of the present disclosure, an eNB apparatus for controlling a handover of a terminal in a wireless communication system is provided. The eNB apparatus includes a communication unit configured to communicate with at least one of a neighboring eNB and an MME, and a controller configured to receive a message indicating a link connection failure between the neighboring eNB and the MME, and to restrict an execution of a handover based on a link connection between the neighboring eNB and the MME.

In accordance with another aspect of the present disclosure, an MME apparatus for controlling a handover of a terminal in a wireless communication system is provided. The MME apparatus includes a communication unit configured to communicate with at least one of an eNB and a different MME, and a controller configured to provide a control to detect a link connection failure with respect to the MME and at least one eNB, and to transmit, to at least one different eNB connected to the MME, a message indicating a link connection failure between the MME and the at least one eNB.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a configuration of a message including S1 link connection state information according to an embodiment of the present disclosure;

FIG. 16 illustrates a configuration of an S1 handover request message including MME change request information according to an embodiment of the present disclosure.

Throughout the drawings, it should be noted that like reference numbers are used to depict the same or similar elements, features, and structures.

DETAILED DESCRIPTION

Figure 1:
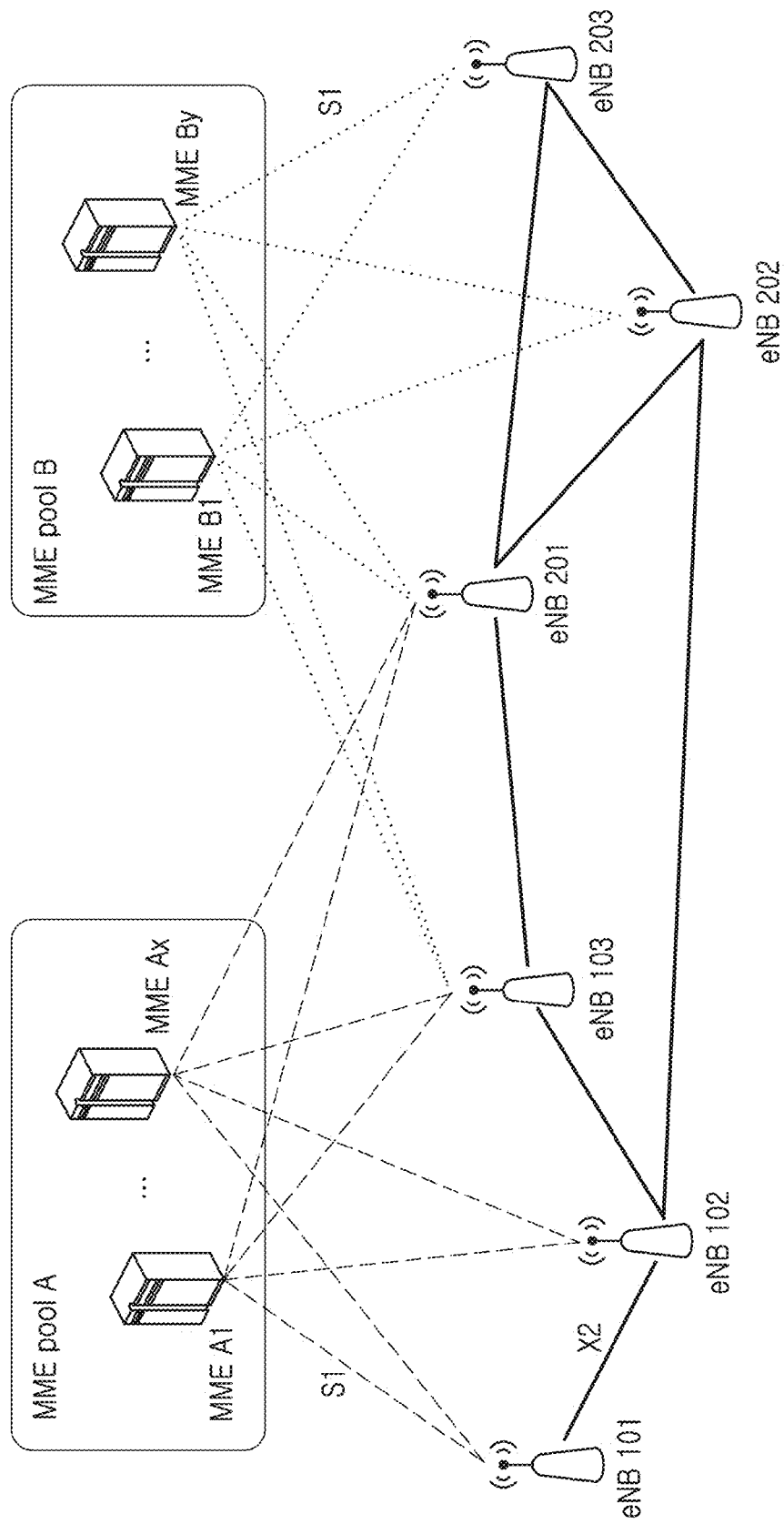
FIG. 1 illustrates an S1 interface and an X2 interface between a Mobile Management Entity (MME) and an eNodeB (eNB) in a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 17, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

A method described in detail hereinafter relates to a method of restricting a handover which uses an S1 link in a connection failure state in such a manner that, if an S1 link connection failure is detected between an eNodeB (eNB) and a Mobile Management Entity (MME) in a wireless communication system, the eNB and/or MME which has detected the S1 link connection failure exchanges information regarding an S1 link connection failure state with a neighboring eNB and/or network nodes. In various embodiments of the present disclosure described below, an attempt of a handover which uses an S1 link in a connection failure state for a pre-set time may be restricted, or a serving MME of a corresponding terminal or a target eNB may be changed for the handover which uses the S1 link in the connection failure state.

FIG. 1 illustrates an S1 interface and an X2 interface between an MME and an eNB in a communication system according to an embodiment of the present disclosure.

Referring to FIG. 1, a wireless communication system is illustrated, where the wireless communication system may consist of a plurality of MME pools including at least one MME. For example, the wireless communication system may include an MME pool A and an MME pool B. The MME pool A may include an MME A1 to an MME Ax. The MME pool B may include an MME B1 to an MME By.

Each MME may be coupled with at least one eNB. Further, each eNB may be coupled with a plurality of MMEs. For example, each of the MME A1 to MME Ax included in the MME pool A may be connected to an eNB 101, an eNB 102, an eNB 103, and an eNB 201 through an S1 interface to perform communication.

In addition, each of the MME B1 to MME By included in the MME pool B may be connected to the eNB 103, the eNB 201, an eNB 202, and an eNB 203 through the S1 interface to perform communication. Further, each eNB may perform communication through the X2 interface. In various embodiments of the present disclosure described hereinafter, it is assumed that a handover is controlled in a situation where a problem occurs in an S1 link between the MME A1 and the eNB 103, which results in a failure of an S1 link connection, as illustrated in FIG. 1.

Figure 2:
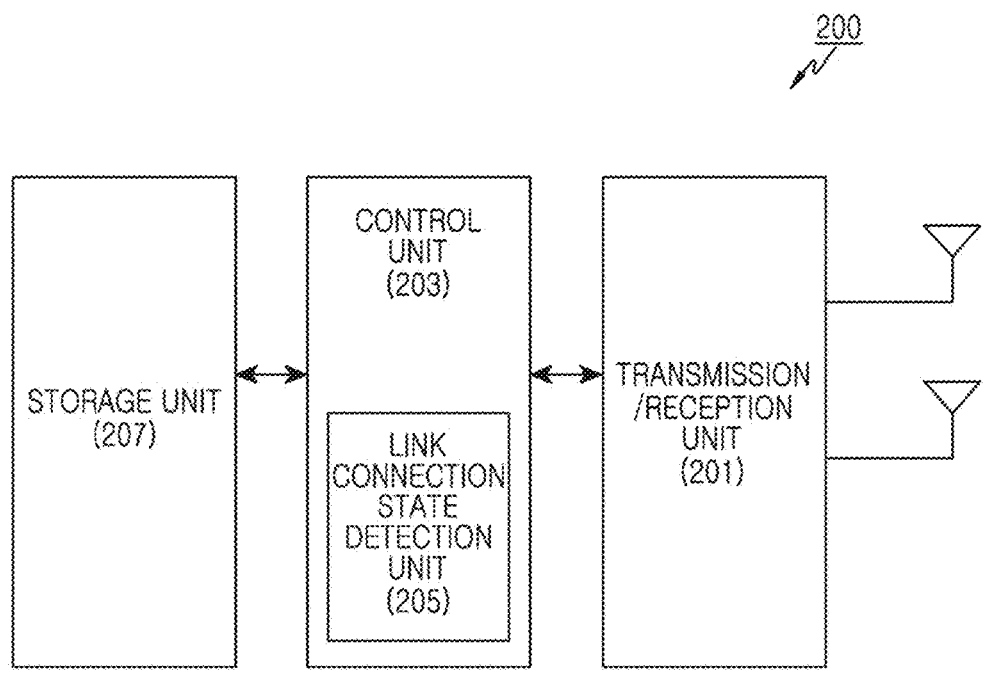
FIG. 2 illustrates a block diagram of an eNB according to an embodiment of the present disclosure.

FIG. 2 illustrates a block diagram of an eNB according to an embodiment of the present disclosure.

Referring to FIG. 2, an eNB 200 is illustrated, where the eNB 200 may include a transmission/reception unit 201, a control unit 203, and a storage unit 207.

The transmission/reception unit 201 may transmit a signal to at least one of a terminal, a neighboring eNB, and an MME under the control of the control unit 203, or may receive a signal from at least one of the terminal, the neighboring eNB, and the MME. For example, the transmission/reception unit 201 may transmit/receive messages for a handover of the terminal. The transmission/reception unit 201 may detect an S1 connection failure under the control of the control unit 203, and may transmit a message including information regarding an S1 link connection state to at least one communicable neighboring eNB and/or MME.

For example, the transmission/reception unit 201 may transmit the message including information regarding the 51 link connection state to all neighboring eNBs that can communicate through an X2 interface and all MMEs that can communicate through an S1 interface, and may transmit the message including the S1 link connection state to a peer eNB which receives a handover message. Although the transmission/reception unit 201 is configured as one module in an embodiment of the present disclosure, the transmission/reception unit 201 may be separately configured as a transmission unit and a reception unit according to a design rule.

The control unit 203 controls and processes an overall operation of an eNB for communication of the terminal, detects an S1 link connection state for the eNB and the MME, and controls and processes an overall operation for restricting a handover for a serving terminal and/or a serving terminal of a neighboring eNB on the basis of the detected S1 link connection state.

In particular, the control unit 203 may include a link connection state detection unit 205 to detect an S1 link connection state for at least one MME. The link connection state detection unit 205 detects an S1 link connection failure for an MME connected to the eNB 200, and controls and processes a function for transmitting S1 link connection state information indicating the S1 link connection failure to a neighboring eNB and/or a different MME. The link connection state detection unit 205 sets a handover restricted time (or a handover prohibited time) for a specific MME upon detection of a link connection failure for the specific MME, and controls and processes a function for changing a serving MME of terminals, which receive a service by being registered to the specific MME during the handover restricted time, from the specific MME to a different MME in the same group.

Herein, the S1 link connection state information may be transmitted through an X2 eNB configuration update message, or may be transmitted through a different message. The X2 link connection state information may include at least one of group identification information of a corresponding MME, identification information for the corresponding MME, indication information indicating a success or failure of an S1 link connection, and a handover restricted time.

The handover restricted time may be a fixed value pre-set according to a system operation rule, and may be set and changed by an operator. For example, since the S1 link connection may be detected as the failure even if the S1 link is temporarily denied not according to an S1 link problem but rather according to another purpose of the operator (e.g., an Internet Protocol (IP) address change), the handover restricted time may be set and changed by the operator in this case. When the handover restricted time is changed, the link connection state detection unit 205 controls and processes a function for transmitting information regarding the changed handover restricted time to a neighboring eNB and/or a different MME. Further, the link connection state detection unit 205 controls and processes a function for periodically monitoring an S1 link of which an S1 link connection is detected as the failure, or upon detection of an S1 link connection success by an input of the operator, controls and processes a function for reporting that the S1 link connection state has been restored to the neighboring eNB and/or the different MME.

Further, the link connection state detection unit 205 may receive a message including S1 link connection state information from the neighboring eNB to detect an S1 link connection failure between the neighboring eNB and a specific MME. Accordingly, the link connection state detection unit 205 confirms the handover restricted time from the message, and controls the handover of the terminal so that the terminal does not use a corresponding S1 link connection during the handover restricted time.

For example, in a situation where the S1 link connection failure is detected between a first neighboring eNB and a first MME, upon detection of a situation where a terminal, which receives a service through the first MME, needs to perform a handover to the first neighboring eNB, the link connection state detection unit 205 controls and processes a function for performing a handover of the terminal to the first neighboring eNB after changing a serving MME of the terminal to a different MME in a group of the first MME. Accordingly, since the first neighboring eNB and the different MME are in a state of being connected to the S1 link, the terminal may continuously receive a service via the first neighboring eNB or the different MME.

Further, for example, in a situation where the S1 link connection failure is detected between the first neighboring eNB and the first MME, upon detection of the situation where the terminal which receives the service through the first MME needs to perform the handover to the first neighboring eNB, the link connection state detection unit 205 may change a handover target eNB of the terminal to a different neighboring eNB other than the first neighboring eNB. Accordingly, even if a measurement report message received from the terminal indicates that the first neighboring eNB has the best channel measurement result, the link connection state detection unit 205 may determine a different neighboring eNB included in the measurement report message as a target eNB.

The storage unit 207 may store a variety of programs and data for an overall operation of the eNB. The storage unit 207 may store information regarding the eNB and MME of which an S1 link connection is detected as the failure under the control of the control unit 203. For example, the storage unit 207 may store at least one of identification information of an eNB of which an S1 link connection is detected as the failure, MME identification information, MME group identification information, and handover restricted time information.

Figure 3:
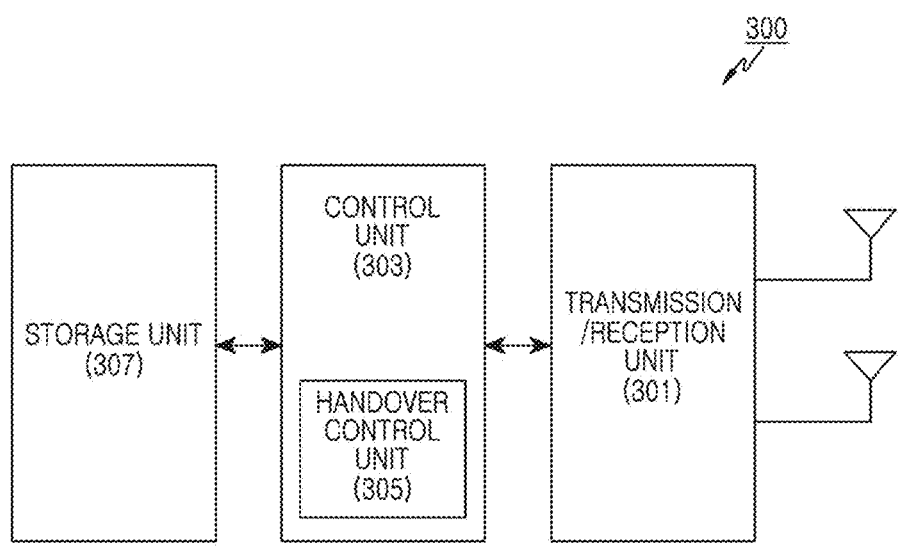
FIG. 3 illustrates a block diagram of an MME according to an embodiment of the present disclosure.

FIG. 3 illustrates a block diagram of an MME according to an embodiment of the present disclosure.

Referring to FIG. 3, an MME 300 is illustrated, where the MME 300 may include a transmission/reception unit 301, a control unit 303, and a storage unit 307.

The transmission/reception unit 301 may transmit a signal to at least one eNB and a different MME under the control of the control unit 303, or may receive a signal from the at least one eNB and the different MME. For example, the transmission/reception unit 301 may transmit/receive messages for providing a service to a terminal and messages for a handover.

The transmission/reception unit 301 may detect an S1 connection failure under the control of the control unit 303, and may transmit information regarding an S1 link connection state to at least one communicable eNB and/or different MME. For example, the transmission/reception unit 301 may transmit a message including information regarding an S1 link connection state between a specific eNB and an MME to the at least one communicable eNB through an S1 interface, and may transmit a message including information regarding an S1 link connection state between the specific eNB and the MME to an eNB which has transmitted a handover message. Although the transmission/reception unit 301 is configured as one module in an embodiment of the present disclosure, the transmission/reception unit 301 may be separately configured as a transmission unit and a reception unit according to a design rule. Further, the transmission/reception unit 301 may transmit the message including the information regarding the S1 link connection state to at least one different MME in an MME group to which the MME belongs.

The control unit 303 may control and process an overall operation of an MME for communication of the terminal, may detect an S1 link connection state for a specific eNB, and may perform an operation for controlling a handover for a terminal registered to the MME on the basis of the detected S1 link connection state. For example, the control unit 303 detects an S1 link connection failure for the specific eNB 200, and controls and processes a function for transmitting S1 link connection state information indicating a failure of the S1 link connection to a different eNB connected through an S1 link and/or a different MME in the same MME group.

Herein, the S1 link connection state information may be transmitted through an S1 handover preparation failure message corresponding to a response message for an S1 handover request message, and may be transmitted through a different separate message.

In addition, the S1 link connection state information may include at least one of corresponding eNB identification information, MME group identification information, MME identification information, indication information indicating a success or failure of the S1 link connection, and a handover restricted time. Further, the control unit 303 controls and processes a function for periodically monitoring an S1 link of which an S1 link connection is detected as the failure, or upon detection of an S1 link connection success by an input of the operator, controls and processes a function for reporting that the S1 link connection state has been restored to the neighboring eNB and/or the different MME.

In particular, the control unit 303 may include a handover control unit 305 and thus, upon reception of a message for requesting an MME change of a specific terminal from an eNB, may perform a process of changing the MME of the specific terminal by selecting an MME of which an S1 link is connected to an eNB to which the specific terminal intends to perform a handover in an MME group to which the MME belongs.

The storage unit 307 may store a variety of programs and data for an overall operation of the MME. The storage unit 307 may store information regarding the eNB and MME of which an S1 link connection is detected as the failure under the control of the control unit 303. For example, the storage unit 307 may store at least one of identification information of an eNB of which an S1 link connection is detected as the failure, MME identification information, MME group identification information, and handover restricted time information.

Figure 4:
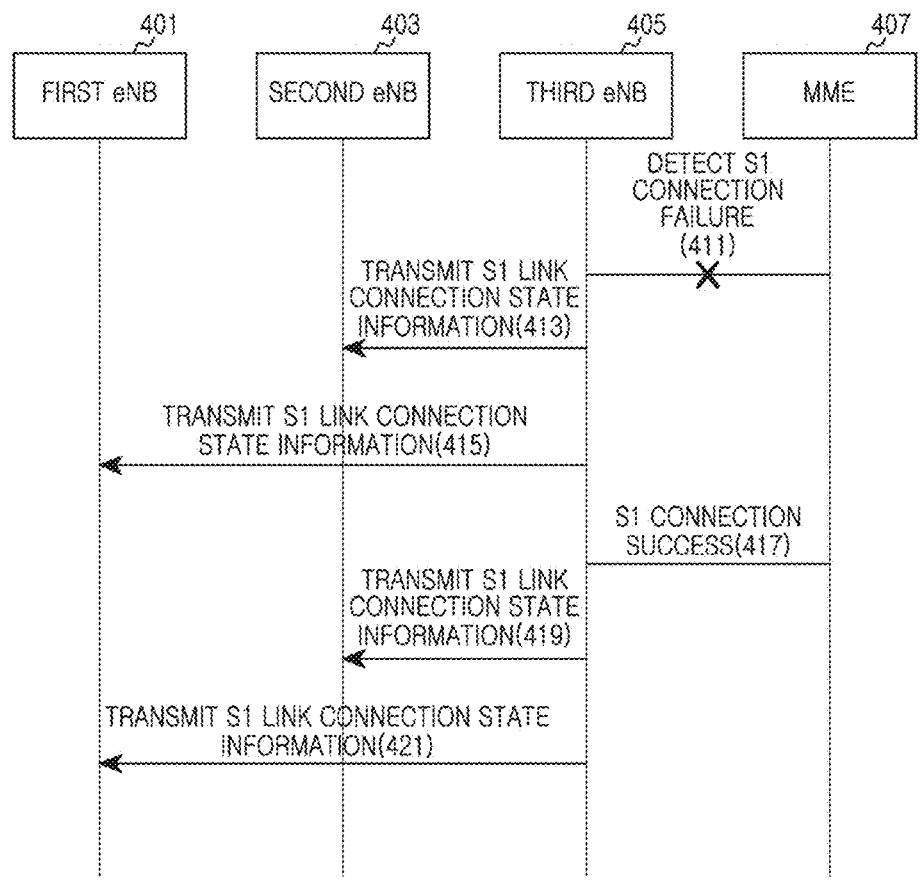
FIG. 4 illustrates a signal flow for an operation of transmitting S1 link connection state information if an S1 link connection failure is detected according to an embodiment of the present disclosure.

FIG. 4 illustrates a signal flow for an operation of transmitting S1 link connection state information if an S1 link connection failure is detected according to an embodiment of the present disclosure. It is assumed in FIG. 4 that, in a situation where an MME and each of a first eNB, a second eNB, and a third eNB perform an S1 link connection, an S1 link connection between the MME and the third eNB fails.

Referring to FIG. 4, a signal flow of a first eNB 401, a second eNB 403, a third eNB 405 and an MME 407 is illustrated, where the third eNB 405 detects an S1 link connection failure between the third eNB 405 and the MME 407 in operation 411. Thereafter, the third eNB 405 may transmit S1 link connection state information to the second eNB 403 in operation 413, and may transmit the S1 link connection state information to the first eNB 401 in operation 415. Herein, operations 413 and 415 may be performed simultaneously. For example, upon detection of an S1 link connection failure for the MME, in order to report a failure of an S1 link connection, the eNB may transmit link connection state information to a plurality of neighboring eNBs connected through an X2 interface.

FIG. 5 illustrates a configuration of a message including S1 link connection state information according to an embodiment of the present disclosure.

Referring to FIG. 5, a message including S1 link connection state information is illustrated, where an eNB may transmit a well-known X2 eNB configuration update message by including S1 link connection state information and group identification information of an MME of which an S1 link connection is detected as a failure. Herein, the S1 link connection state information may include at least one of an MME code which is the identification information for the MME of which the S1 link connection is detected as the failure, an S1 link connection state for the MME, and a handover (HO) restricted (prohibit) time in the MME (e.g., "Intra-MME HO prohibit time"). Further, the S1 link connection state for the MME may include information regarding a failure cause of the S1 link connection state. For example, the S1 link connection state for the MME may indicate whether the failure is caused by an S1 link problem or by a temporary S1 link denial according to a system operation.

Turning back to FIG. 4, in operation 417, since the S1 link connection with the MME 407 is restored, the third eNB 405 may detect a success of the S1 link connection. Thereafter, in operations 419 and 421, the third eNB 405 may transmit S1 link state information indicating an S1 link connection success to the second eNB 403 and the first eNB 401. For example, upon detection of the S1 link connection success, the third eNB 405 may transmit link connection state information to a neighboring eNB to report a success of the S1 link connection. In this case, the eNB may report the S1 link connection success by using the well-known X2 eNB configuration update message or a different message.

Figure 6A:
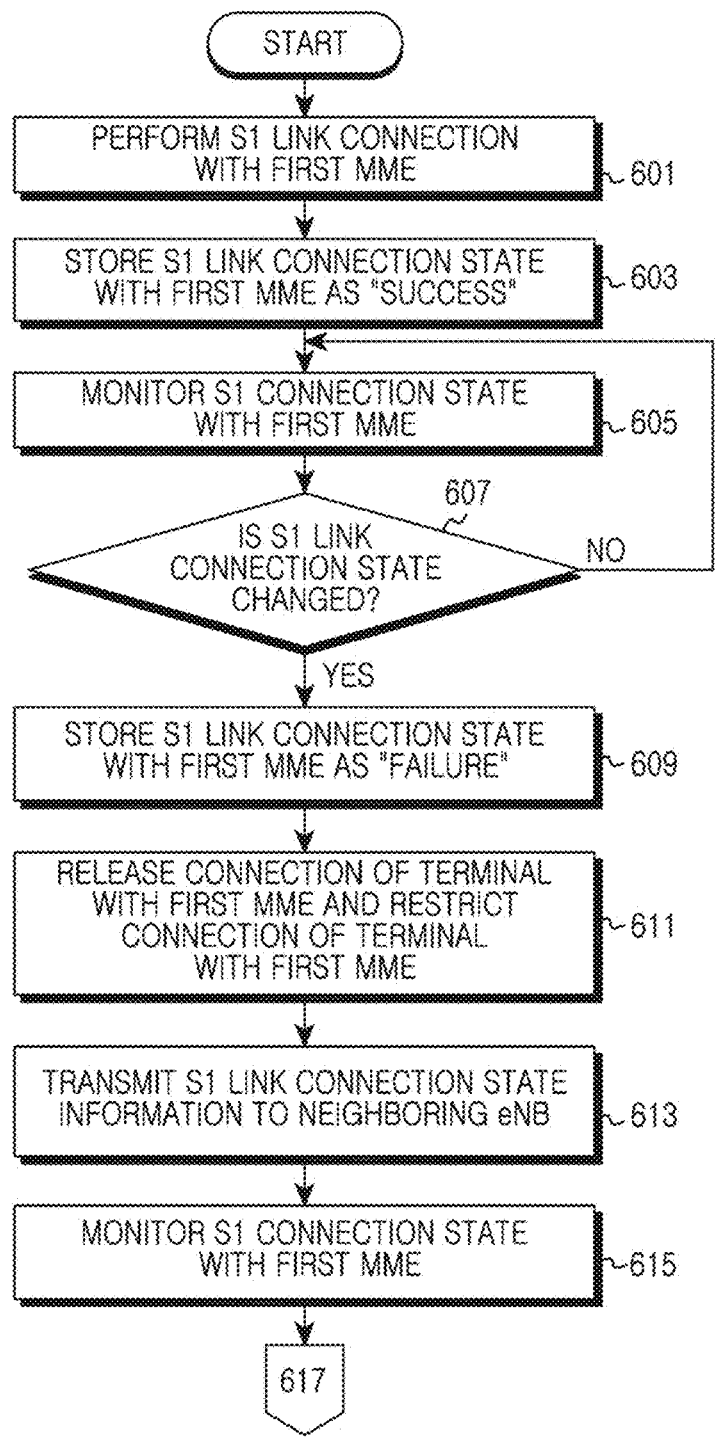
FIGS. 6A and 6B illustrate a procedure for controlling a handover if an S1 link connection failure is detected in a first eNB according to various embodiments of the present disclosure.
Figure 6B:
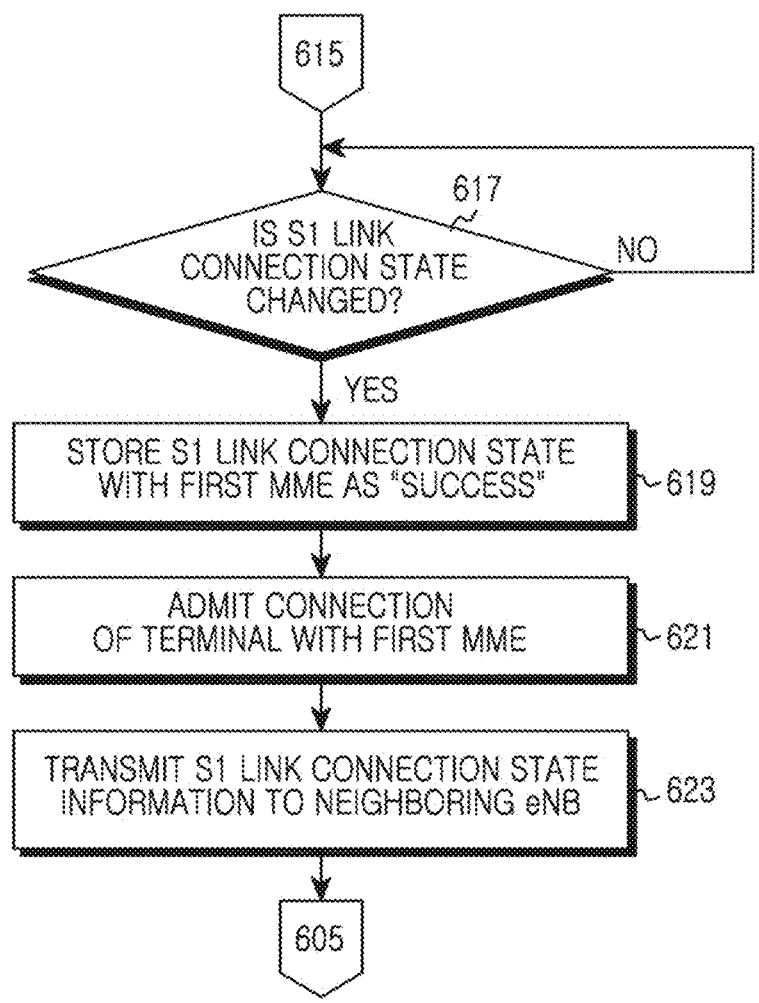

FIGS. 6A and 6B illustrate a procedure for controlling a handover if an S1 link connection failure is detected in a first eNB according to an embodiment of the present disclosure. Herein, for convenience of explanation, an eNB which has detected a link connection failure with respect to an MME is called the first eNB.

Referring to FIG. 6A, a procedure is illustrated, in which a first eNB may perform an S1 link connection with a first MME in operation 601, and may store an S1 link connection state with respect to the first MME as a "success" in operation 603. Thereafter, the first eNB may monitor the S1 link connection state with respect to the first MME in operation 605.

In operation 607, the first eNB examines whether the S1 link connection state is changed as a result of monitoring the S1 link connection state. For example, the first eNB may successfully perform the S1 link connection with the first MME, and thereafter may continuously monitor an S1 link with the first MME to examine whether the S1 link connection with the first MME is changed to a failure. If the S1 link connection state is not changed, operation 607 returns to operation 605, so that the first eNB may repeat operation 605.

Otherwise, if the S1 link connection state is changed, proceeding to operation 609, the first eNB may store the S1 link connection state with respect to the first MME as the "failure." For example, upon detection of the S1 link connection failure, the first eNB may store the S1 link connection state by changing it from "success" to "failure."

Thereafter, in operation 611, the first eNB may release the connection of the terminal with respect to the first MME, and may restrict the connection to the first MME so that a new terminal is not connected to the first MME. More specifically, since the S1 link connection with the first MME is detected as the failure, the first eNB may determine that a service cannot be provided to the terminal which is registered to the first MME and thus receives the service. Further, the first eNB may release the connection with the terminal which is registered to the first MME and thus receives the service, and may restrict a connection of a new terminal with respect to the first MME.

Thereafter, in operation 613, the first eNB may transmit S1 link connection state information for the first MME to at least one neighboring eNB connected through an X2 interface. In other words, the first eNB may transmit information indicating a failure of an S1 link connection between the first eNB and the first MME to at least one neighboring eNB. For example, the first eNB may transmit the information indicating the failure of the S1 link connection between the first eNB and the first MME to a neighboring eNB connected to the first MME, a neighboring eNB connected to a different MME in the same MME group, or a neighboring eNB connected through the X2 interface.

Thereafter, the first eNB may monitor the S1 connection state with respect to the first MME in operation 615, and may examine whether the S1 link connection state is changed according to a result of the monitoring in operation 617. In other words, in a state where the S1 link connection state with respect to the first MME is the failure, the first eNB may examine whether the S1 link connection state is changed to the "success" by continuously monitoring the S1 link for a connection change in operation 617. If the S1 link connection state is not changed, the first eNB may repeat operation 617 and its subsequent operations.

Otherwise, if the S1 link connection state is changed, proceeding to operation 619, the first eNB may store the S1 link connection state with respect to the first MME as the "success." In other words, if the S1 link connection state is restored and thus the S1 link connection state with respect to the first MME is detected as the success, the first eNB may store the S1 link connection state by changing it from "failure" to "success."

Thereafter, in operation 621, the first eNB may admit a connection of the terminal with respect to the first MME. In other words, the first eNB may admit a connection of a new terminal with respect to the first MME by releasing a connection restriction of the new terminal with respect to the first MME.

Thereafter, in operation 623, the first eNB may transmit S1 link connection state information for the first MME to at least one neighboring eNB connected through the X2 interface. In other words, the first eNB may transmit information indicating a success of an S1 link connection between the first eNB and the first MME to the at least one neighboring eNB. For example, the first eNB may transmit the information indicating the success of the S1 link connection between the first eNB and the first MME to a neighboring eNB connected to the first MME, a neighboring eNB connected to a different MME in the same MME group, or a neighboring eNB connected through the X2 interface.

Thereafter, returning to operation 605, the first eNB may repeat the operation 605 and its subsequent operations.

Figure 7:
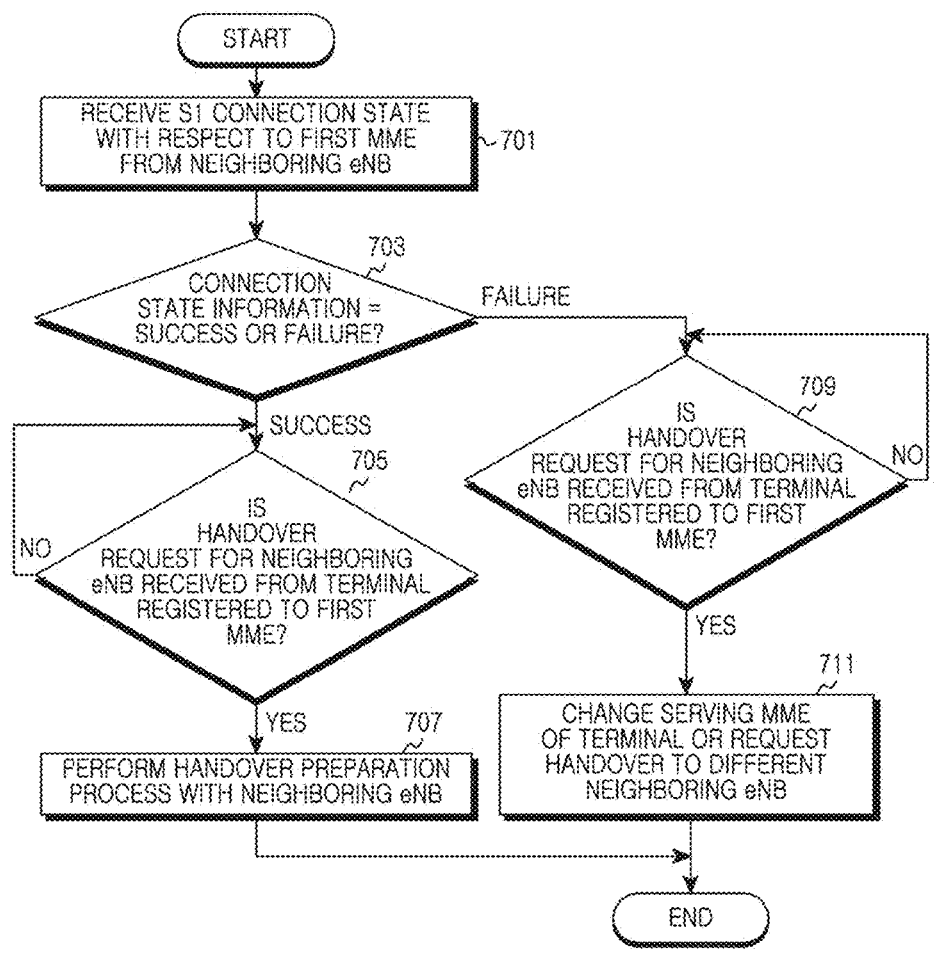
FIG. 7 illustrates a procedure for controlling a handover in a second eNB if an S1 link connection failure is detected between a first eNB and a first MME according to an embodiment of the present disclosure.

FIG. 7 illustrates a procedure for controlling a handover in a second eNB if an S1 link connection failure is detected between a first eNB and a first MME according to an embodiment of the present disclosure. Herein, for convenience of explanation, an eNB which receives information indicating an S1 link connection failure between a neighboring eNB and an MME from the neighboring eNB is called the second eNB.

Referring to FIG. 7, a procedure is illustrated, such that in operation 701, a second eNB may receive S1 connection state information with respect to a first MME from the neighboring eNB. In other words, the second eNB may receive S1 connection state information between the neighboring eNB and the first MME from the neighboring eNB. Accordingly, the received S1 connection state information may be information indicating a connection success or failure.

Thereafter, in operation 703, the second eNB may confirm whether the received connection state information is information indicating a success or information indicating a failure.

If the received connection state information is the information indicating the success, proceeding to operation 705, the second eNB may confirm whether a handover request for a neighboring eNB is received from a terminal registered to the first MME.

If the handover request for the neighboring eNB is not received from the terminal registered to the first MME, the second eNB may repeat the operation 705 and its subsequent operations.

Otherwise, if the handover request for the neighboring eNB is received from the terminal registered to the first MME, proceeding to operation 707, the second eNB may perform a handover preparation process with respect to the neighboring eNB, and thereafter may end the procedure according to an embodiment of the present disclosure.

Meanwhile, if the received connection state information is the information indicating the failure in operation 703, proceeding to operation 709, the second eNB may confirm whether a handover request for the neighboring eNB is received from the terminal registered to the first MME. If the handover request for the neighboring eNB is not received from the terminal registered to the first MME, the second eNB may repeat the operation 709 and its subsequent operations.

Otherwise, if the handover request for the neighboring eNB is received from the terminal registered to the first MME, proceeding to operation 711, the second eNB may change a serving MME of the terminal or may request a handover to a different neighboring eNB. In other words, if an event of a handover to the first neighboring eNB from the terminal registered to the first MME is detected in a state where a failure of an S1 connection is confirmed between the first MME and the first neighboring eNB, in order to continuously provide a service to the terminal, the second eNB may change a serving MME of the terminal from the first MME to a different MME, or may determine a handover target eNB of the terminal to a different neighboring eNB other than the first neighboring eNB. Herein, the different MME may be a different MME which is performing an S1 link connection with the first neighboring eNB in an MME group to which the first MME belongs. Further, the different neighboring eNB may be a different neighboring eNB which has reported a channel state through a measurement report message.

Thereafter, the second eNB may end the procedure according to an embodiment of the present disclosure.

Figure 8:
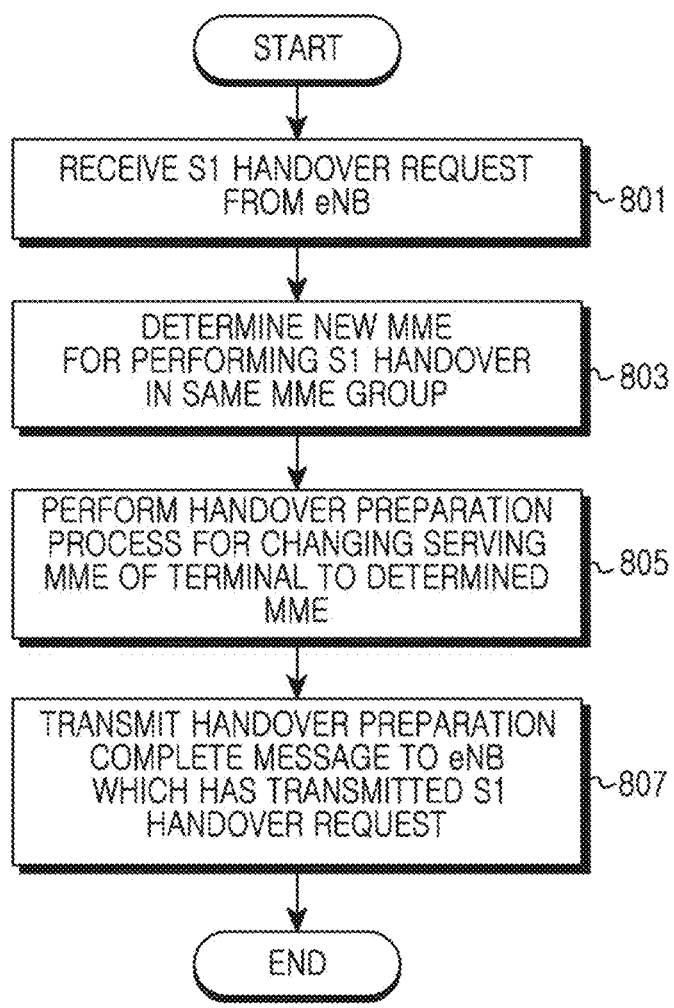
FIG. 8 illustrates a procedure for controlling a handover if an S1 link connection failure is detected in an MME according to an embodiment of the present disclosure.

FIG. 8 illustrates a procedure for controlling a handover if an S1 link connection failure is detected in an MME according to an embodiment of the present disclosure.

Referring to FIG. 8, a procedure is illustrated, such that in operation 801, an MME may receive an S1 handover request from an eNB. More specifically, the MME may receive from the eNB a handover request for changing a serving MME of a terminal to a different MME.

Thereafter, in operation 803, the MME may determine a new MME for performing an S1 handover in the same MME group. In this case, in order to successfully perform the S1 handover, the MME may select an MME of which an S1 link connection with a handover target eNB of the terminal is not detected as a failure among MMEs included in the same MME group as the MME. If there is a plurality of MMEs of which an S1 link connection with the handover target eNB of the terminal is not detected as the failure, the MME may determine a new MME for performing the S1 handover on the basis of a pre-set priority.

Thereafter, the MME may perform a handover preparation process for changing the serving MME of the terminal to the determined MME in operation 805, and proceeding to operation 807, may transmit a handover preparation complete message to the eNB which transmits the S1 handover request. In other words, if the handover preparation process is complete, the MME may transmit to the eNB which has transmitted the handover request a message indicating that the handover preparation has been completed normally.

Thereafter, the MME may end the procedure according to an embodiment of the present disclosure.

Figure 9:
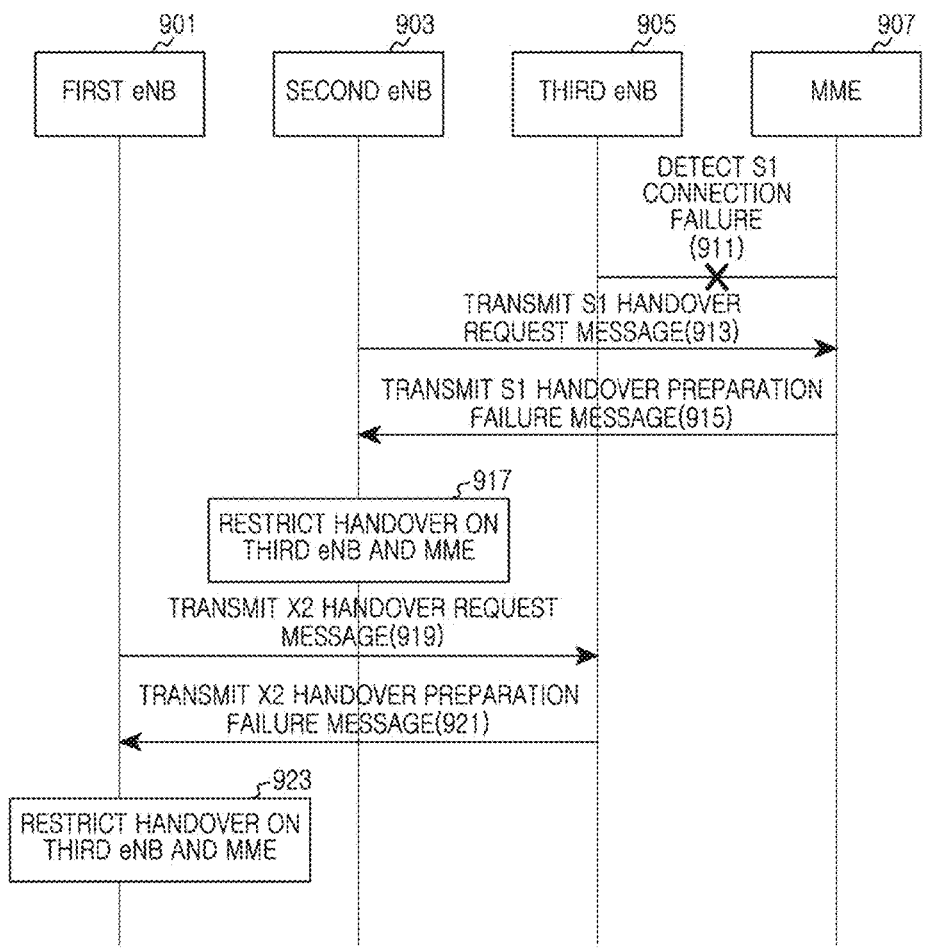
FIG. 9 illustrates a signal flow for an operation of transmitting S1 link connection state information if a handover request is received in a communication system according to an embodiment of the present disclosure.

FIG. 9 illustrates a signal flow for an operation of transmitting S1 link connection state information if a handover request is received in a communication system according to an embodiment of the present disclosure. It is assumed in FIG. 9 that, in a situation where an MME and each of a first eNB, a second eNB, and a third eNB perform an S1 link connection, an S1 link connection between the MME and the third eNB fails.

Referring to FIG. 9, a signal flow of a first eNB 901, a second eNB 903, a third eNB 905 and an MME 907 is illustrated, such that in operation 911, each of the third eNB 905 and the MME 907 detects an S1 link connection failure between the third eNB 905 and the MME 907.

After detection of the S1 link connection failure, the MME 907 may receive an S1 handover request message from the second eNB 903 in operation 913, and may transmit an S1 handover preparation failure message to the second eNB 903 in operation 915. For example, the MME 907 may receive an S1 handover request message including identification information of a handover target eNB of a terminal from the second eNB 903, and may confirm from the received S1 handover request message that the handover target eNB of the terminal is the third eNB 905. Accordingly, since it is recognized that the S1 link connection with the third eNB 905 has failed, the MME 907 may transmit an S1 handover preparation failure message indicating a state where an S1 link connection with the handover target eNB has failed.

Figure 10:
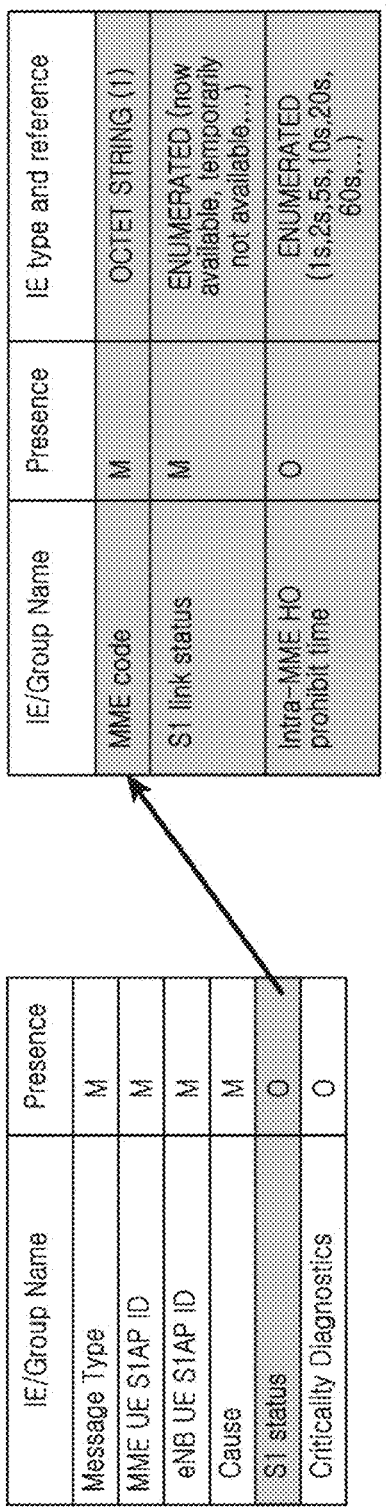
FIG. 10 illustrates a configuration of an S1 handover preparation failure message including S1 link connection state information according to an embodiment of the present disclosure.

FIG. 10 illustrates a configuration of an S1 handover preparation failure message including S1 link connection state information according to an embodiment of the present disclosure.

Referring to FIG. 10, a S1 handover preparation failure message is illustrated, where the S1 handover preparation failure message may include state information regarding the S1 link connection, and may include an MME code which is identification information for the MME, an S1 link connection state for the MME, and a handover (HO) restricted (prohibit) time in the MME (e.g., "Intra-MME HO prohibit time").

Turning back to FIG. 9, in operation 917, the second eNB 903 may restrict a handover of the terminal with respect to the third eNB 905 and the MME 907.

More specifically, the second eNB 903 may confirm a failure of an S1 link connection between the third eNB 905 and the MME 907 from the received S1 handover preparation failure message, and if the terminal registered to the MME 907 intends to perform a handover to the third eNB 905, may provide control to perform the handover by changing the serving MME of the terminal or by changing the handover target eNB of the terminal to a different eNB other than the third eNB 905.

Meanwhile, the third eNB 905 which has detected the S1 link connection failure with respect to the MME 907 in operation 911 may receive an X2 handover request message from the first eNB 901 in operation 919, and may transmit an X2 handover preparation failure message to the first eNB 901 in operation 921. For example, the third eNB 905 may receive the X2 handover request message including identification information for the serving MME of the terminal from the first eNB 901, and may confirm from the received X2 handover request message that the serving MME of the terminal is the MME 907 of which an S1 link connection with the third eNB 905 has failed. Accordingly, since it is recognized that the S1 link connection with the MME 907 has failed, the third eNB 905 may transmit an X2 handover preparation failure message indicating a state where an S1 link connection with the MME 907, which is the serving MME of the terminal, has failed.

Figure 11:
FIG. 11 illustrates a configuration of an X2 handover preparation failure message including S1 link connection state information according to an embodiment of the present disclosure.

FIG. 11 illustrates a configuration of an X2 handover preparation failure message including S1 link connection state information according to an embodiment of the present disclosure.

Referring to FIG. 11, a X2 handover preparation failure message is illustrated, where the X2 handover preparation failure message may include state information regarding the S1 link connection, and may include an MME code which is identification information for the MME, an S1 link connection state for the MME, and a handover (HO) restricted (prohibit) time in the MME (e.g., "Intra-MME HO prohibit time").

Turing back to FIG. 9, in operation 923, the first eNB 901 may restrict a handover of the terminal with respect to the third eNB 905 and the MME 907. More specifically, the first eNB 901 may confirm a failure of an S1 link connection between the third eNB 905 and the MME 907 from the received X2 handover preparation failure message, and if the terminal registered to the MME 907 intends to perform a handover to the third eNB 905, may provide control to perform the handover by changing the serving MME of the terminal or by changing the handover target eNB of the terminal to a different eNB other than the third eNB 905.

Figure 12:
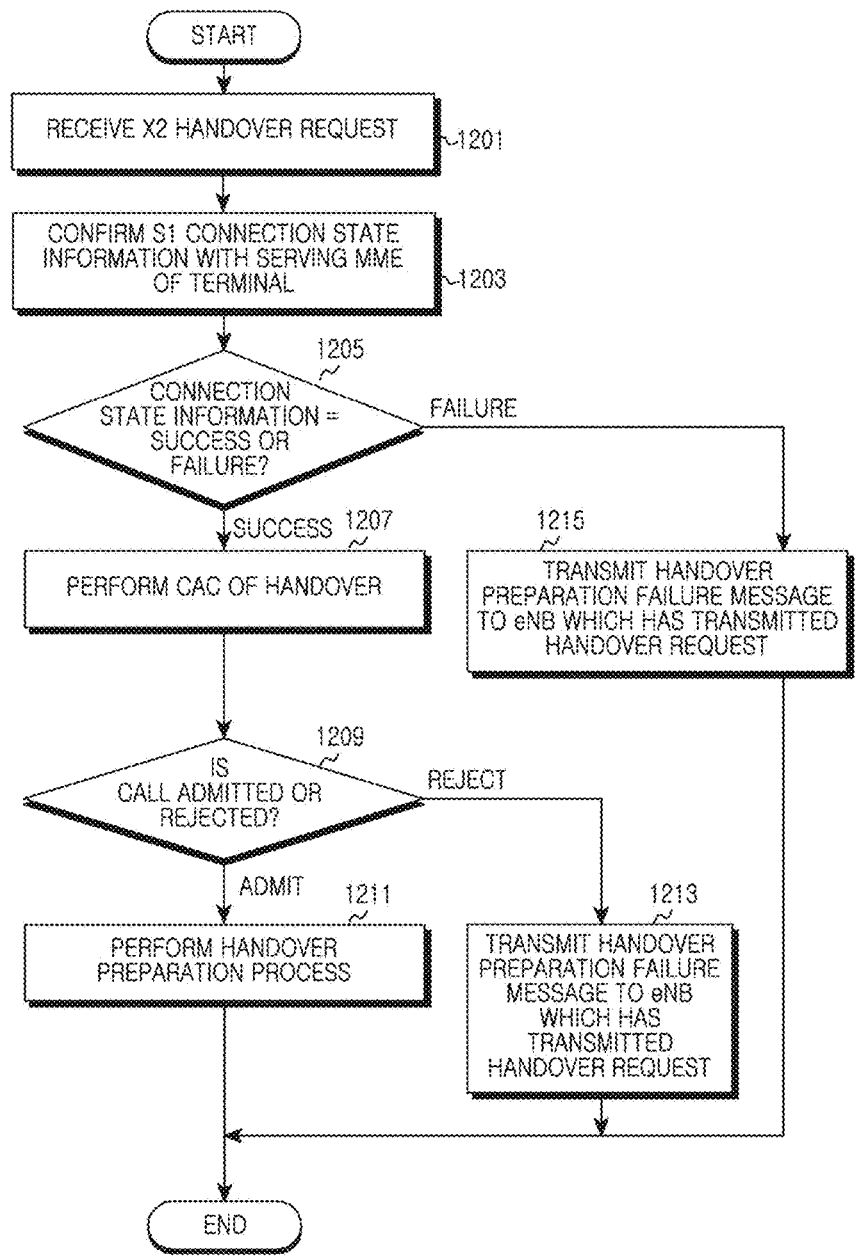
FIG. 12 illustrates a procedure for controlling a handover if a handover request is received from a first eNB according to an embodiment of the present disclosure.

FIG. 12 illustrates a procedure for controlling a handover if a handover request is received from a first eNB according to an embodiment of the present disclosure. Herein, for convenience of explanation, an eNB which has detected a link connection failure with respect to an MME is called the first eNB.

Referring to FIG. 12, a procedure is illustrated, such that in operation 1201, a first eNB may receive an X2 handover request from a neighboring eNB.

Thereafter, the first eNB may confirm 51 link connection state information with respect to a serving MME of a terminal in operation 1203, and may confirm whether the S1 link connection state information indicates a success or a failure in operation 1205. In other words, the first eNB may confirm the serving MME of the terminal from an X2 handover request message, and may confirm 51 link connection sate information between the first eNB and the serving MME of the terminal to confirm whether an S1 link connection is in a success state or in a failure state.

If it is confirmed that the S1 link connection state is the success state, the first eNB may perform a Call Admission Control (CAC) of a handover in operation 1207, and may determine whether to admit or reject a call for the terminal in operation 1209.

If the call of the handover is admitted, proceeding to operation 1211, the first eNB may perform a handover preparation process, and thereafter may end the procedure according to an embodiment of the present disclosure.

Otherwise, if the call of the handover is rejected, proceeding to operation 1213, the first eNB may transmit a handover preparation failure message to a neighboring eNB which has transmitted a handover request. In other words, if the first eNB rejects the call admission of the handover in a state where an S1 connection state between the first eNB and the serving MME of the terminal is the success, the first eNB may transmit a handover preparation failure message to the eNB which has transmitted the handover request. Thereafter, the first eNB may end the procedure according to an embodiment of the present disclosure.

Otherwise, if it is confirmed in operation 1205 that the S1 link connection state is the failure as a result of the examination, in operation 1215, the first eNB transmits the handover preparation failure message to the neighboring eNB which has transmitted the handover request. The handover preparation failure message may be an X2 handover preparation failure message including information indicating a failure of an S1 link connection state between the first eNB and the serving MME of the terminal.

Thereafter, the first eNB ends the procedure according to an embodiment of the present disclosure.

Figure 13:
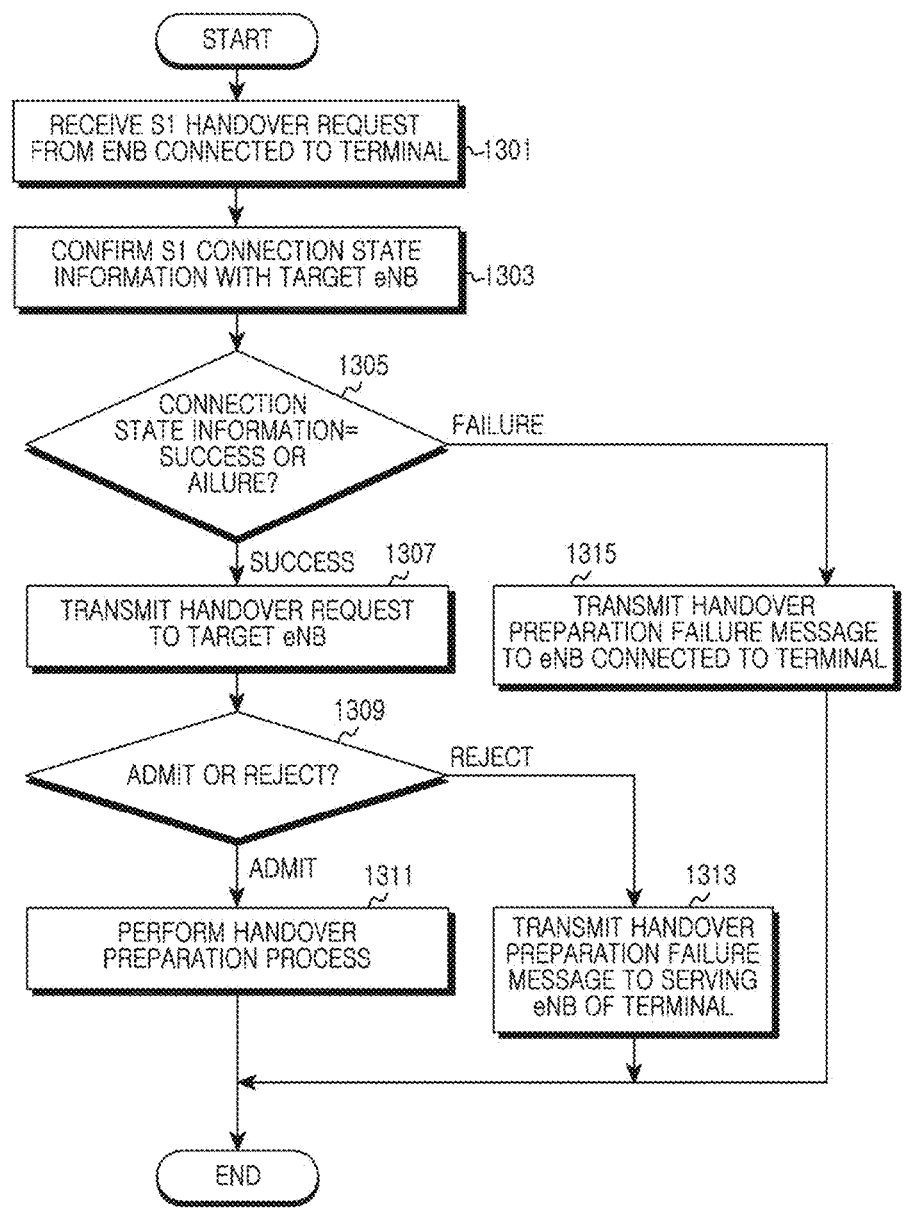
FIG. 13 illustrates a procedure for controlling a handover if an S1 link connection failure is detected with respect to a first eNB in a first MME according to an embodiment of the present disclosure.

FIG. 13 illustrates a procedure for controlling a handover if an S1 link connection failure is detected with respect to a first eNB in a first MME according to an embodiment of the present disclosure.

Referring to FIG. 13, a procedure is illustrated, wherein a first MME may receive an S1 handover request from an eNB connected to a terminal in operation 1301. In operation 1303, the first MME confirms a handover target eNB of the terminal through an S1 handover request message, and confirms S1 link connection state information with respect to the confirmed target eNB. In operation 1305, the first MME examines whether the S1 link connection state information with respect to the target eNB indicates a success or a failure.

If the S1 link connection state information with respect to the target eNB indicates the success, proceeding to operation 1307, the first MME may transmit a handover request to the target eNB. Thereafter, in operation 1309, the first MME examines whether the target eNB admits or rejects the handover request. If the target eNB admits the handover request, in operation 1311, the first MME performs a handover preparation process of the terminal with respect to the target eNB. If the target eNB does not admit the handover request, in operation 1313, the first MME transmits a handover preparation failure message to the serving eNB of the terminal.

Meanwhile, if the S1 link connection state information with respect to the target eNB indicates the failure at operation 1305, in operation 1315, the first MME transmits the handover preparation failure message indicating a failure of an S1 link connection to the serving eNB connected to the terminal. For example, the handover preparation failure message may be an S1 handover preparation failure message including state information for the S1 link connection.

Thereafter, the first MME ends the procedure according to an embodiment of the present disclosure.

Figure 14:
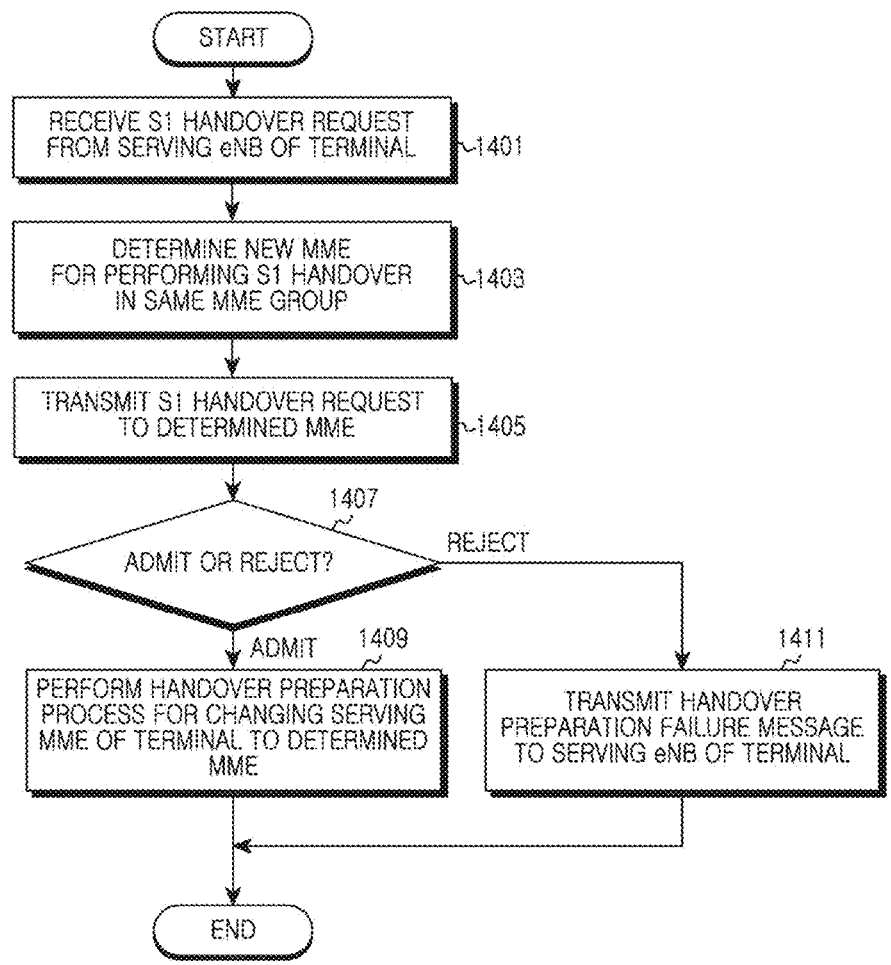
FIG. 14 illustrates a procedure for changing a serving MME of a terminal if an S1 link connection failure is detected in a first MME according to an embodiment of the present disclosure.

FIG. 14 illustrates a procedure for changing a serving MME of a terminal if an S1 link connection failure is detected in a first MME according to an embodiment of the present disclosure.

Referring to FIG. 14, a procedure is illustrated, wherein a first MME receives an S1 handover request message from a serving eNB of the terminal in operation 1401. The S1 handover request message may include target eNB information of the terminal, and may include information indicating that an MME change is necessary for a handover of the terminal to the target eNB.

In operation 1403, the first MME determines a new MME for an S1 handover of a terminal in a MME group to which the first MME belongs. The first MME may determine the new MME by considering an S1 link connection state between the target eNB and a different MME belonging to the MME group to which the first MME belongs.

The first MME transmits an S1 handover request message to the determined new MME in operation 1405, and examines whether the S1 handover request is admitted or rejected from the new MME in operation 1407. For example, the first MME may transmit a message indicating an intention of changing the MME for a handover of the terminal to the new MME. Accordingly, the first MME may receive an admission or rejection message according to the S1 link connection state between the new MME and the target eNB.

Upon reception of an S1 handover admission message from the new MME, in operation 1409, the first MME performs a handover preparation process for changing the serving MME of the terminal to the determined MME. On the other hand, upon reception of an S1 handover rejection message from the new MME, in operation 1411, the first MME transmits a handover preparation failure message to the serving eNB of the terminal.

Thereafter, the first MME ends the procedure according to an embodiment of the present disclosure.

Figure 15:
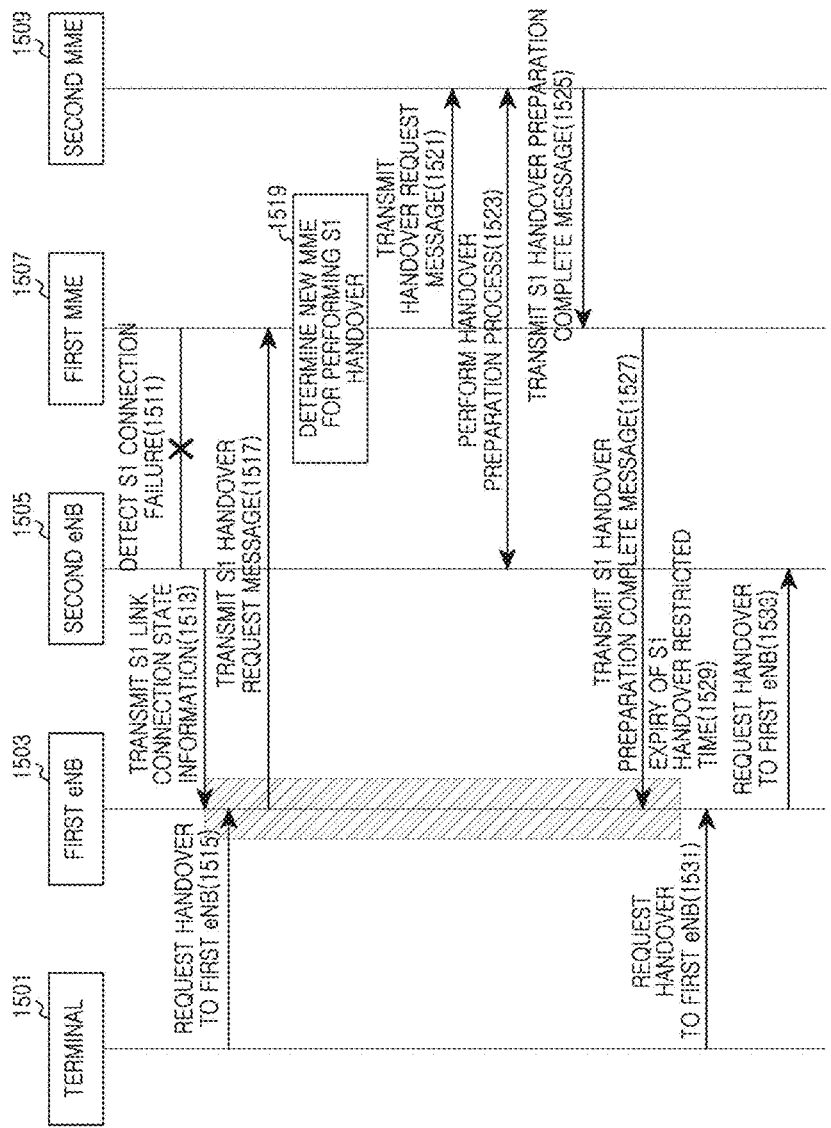
FIG. 15 illustrates a signal flow for an operation of changing a serving MME for a handover of a terminal if an S1 link connection failure is detected in a communication system according to an embodiment of the present disclosure.

FIG. 15 illustrates a signal flow for an operation of changing a serving MME for a handover of a terminal if an S1 link connection failure is detected in a communication system according to an embodiment of the present disclosure.

Referring to FIG. 15, a signal flow is illustrated, in which a second eNB 1505 detects an S1 link connection failure with respect to a first MME 1507 in operation 1511. Herein, whether the S1 link connection failure occurs may be detected according to whether a signal exchanged with the first MME 1507 is successfully transmitted/received. The second eNB 1505 may change a serving MME of a terminal registered to the first MME during a failure of an S1 link connection to a different MME in the same MME group, and may restrict registration of a new terminal to the first MME. Herein, the MME in the same MME group may be identified by using group identification information of the MME.

Upon detection of the S1 link connection failure with respect to the first MME 1507, the second eNB 1505 transmits S1 link connection state information to a first eNB 1503 in operation 1513. Herein, the S1 link connection state information may include an MME code which is identification information of the first MME 1507, group identification information of the first MME, S1 link connection state information, a link failure cause when an S1 link connection fails, and handover restricted time information in the MME.

Upon reception of the S1 link connection state information from the second eNB 1505, the first eNB 1503 stores the S1 link connection state between the second eNB 1505 and the first MME 1507 as a failure, and runs a timer for measuring a handover restricted time.

If the first eNB 1503 receives a handover request message indicating that a handover event condition is satisfied from a terminal 1501 in operation 1515 during the timer for measuring the handover restricted time is running, the first eNB 1503 may perform operation 1517 described below. Herein, the handover request message may include a measurement report message reporting that a channel state for the second eNB 1505 satisfies a handover event. Herein, the first eNB 1503 may confirm that the MME of the terminal is the first MME 1507 and that a handover to the second eNB 1505 is necessary.

In operation 1517, the first eNB 1503 transmits an S1 handover request message for requesting a change of the serving MME of the terminal 1501 to the first MME 1507. That is, since it is a state where the S1 link connection between the first MME 1507 which is the serving MME of the terminal and the second eNB 1505 which is the target eNB has failed, the first eNB 1503 may recognize that the terminal 1501 cannot perform a handover to the second eNB 1505 in the current state, and may request the first MME 1507 to change the serving MME of the terminal to a different MME in the same group.

FIG. 16 illustrates a configuration of an S1 handover request message including MME change request information according to an embodiment of the present disclosure.

Referring to FIG. 16, an S1 handover request message is illustrated, where the first eNB 1503, as illustrated in FIG. 15, may transmit an S1 handover request message by including S1 link connection state information and MME reallocation indication information indicating that it is necessary to change the serving MME of the terminal. In addition, the first eNB 1503 may transmit the S1 handover request message by including information indicating that the handover target eNB of the terminal is the second eNB 1505, as illustrated in FIG. 15, and indicating an S1 link connection state between the second eNB 1505 and at least one different MME. Further, the S1 handover request message includes an MME relocation indicator, an MME code and a handover (HO) restricted (prohibit) time in the MME (e.g., "Intra-MME HO prohibit time").

Turning back to FIG. 15, in operation 1519, the first MME 1507 determines a new MME for the S1 handover of the terminal 1501. Accordingly, the first MME 1507 may determine the new MME by considering an S1 link connection state between the second eNB 1505 which is the handover target eNB of the terminal and at least one different MME. Herein, information indicating the S1 link connection state between the second eNB 1505 and the at least one different MME may be information received from the first eNB 1503 or obtained in advance in the first MME 1507.

For example, the first MME 1507 may determine an MME which is performing the S1 link connection with the handover target eNB of the terminal as a new serving MME of the terminal Herein, it is assumed that the second MME 1509 is determined as the new MME.

In operation 1521, the first MME 1507 transmits a handover request message to a second MME 1509. The handover request message transmitted to the second MME 1509 may be a message which inquires whether a handover preparation process can be performed through the second eNB 1505 which is a target eNB. In operation 1523, the second MME 1509 may confirm an S1 link connection state by transmitting/receiving a signal with respect to the second eNB 1505 to confirm whether a handover preparation of the terminal is possible for the second eNB 1505. If it is confirmed that the S1 link connection state with respect to the second eNB 1505 is normal, the second MME 1509 determines to provide a service for the terminal 1501, and in operation 1525, transmits an S1 handover preparation complete message to the first MME 1507.

In operation 1527, the first MME 1507 transmits to the first eNB 1503 an S1 handover preparation complete message indicating that the serving MME of the terminal is changed from the first MME 1507 to the second MME 1509.

The first eNB 1503 may confirm that the serving MME of the terminal is changed to the second MME 1509 and that the S1 link connection state between the second MME 1509 and the second eNB 1505 is normal, and may perform a preparation process for a handover of the terminal 1501 to the second eNB 1505.

Meanwhile, upon detection of an expiry of a timer for measuring a handover restricted time in operation 1529, the first eNB 1503 may estimate that the S1 link connection state between the second eNB 1505 and the first MME 1507 has been restored. Therefore, if a message for requesting a handover to the second eNB 1505 from a terminal registered to the first MME 1507 is received after the expiry of the handover restricted time in operation 1531, the first eNB 1503 may request the handover of the terminal 1501 to the second eNB 1505 in operation 1533.

Figure 17:
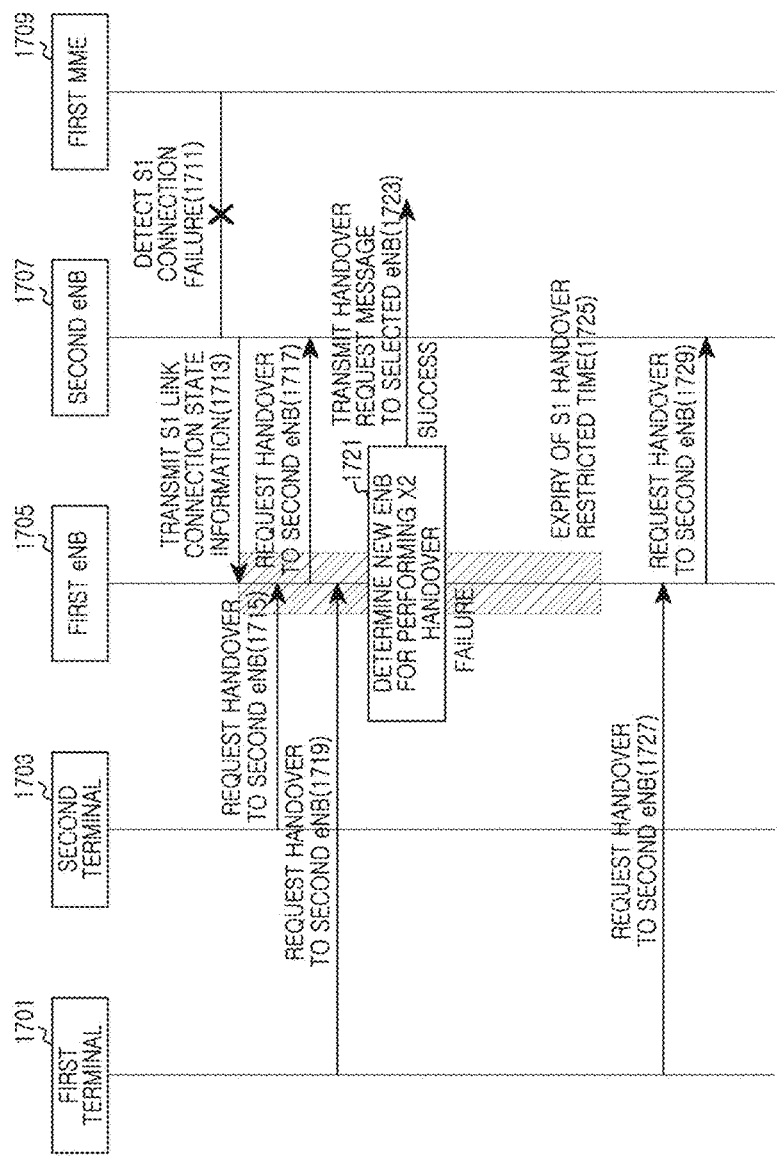
FIG. 17 illustrates a signal flow for an operation of changing a target eNB of a terminal if an S1 link connection failure is detected in a communication system according to an embodiment of the present disclosure.

FIG. 17 illustrates a signal flow for an operation of changing a target eNB of a terminal if an S1 link connection failure is detected in a communication system according to an embodiment of the present disclosure.

Referring to FIG. 17, a signal flow of a first terminal 1701, a second terminal 1703, a first eNB 1705, a second eNB 1707 and a first MME 1709 is illustrated, in which the second eNB 1707 detects an S1 link connection failure with respect to the first MME 1709 in operation 1711. Herein, whether the S1 link connection failure occurs may be detected according to whether a signal exchanged with the first MME 1709 is successfully transmitted/received. The second eNB 1707 may change a serving MME of a terminal registered to the first MME during a failure of an S1 link connection to a different MME in the same MME group, and may restrict registration of a new terminal to the first MME. Herein, the MME in the same MME group may be identified by using group identification information of the MME.

Upon detection of the S1 link connection failure with respect to the first MME 1709, the second eNB 1707 transmits S1 link connection state information to the first eNB 1705 in operation 1713. Herein, the S1 link connection state information may include an MME code which is identification information of the first MME 1709, group identification information of the first MME, S1 link connection state information, a link failure cause when an S1 link connection fails, and handover restricted time information in the MME.

Upon reception of the S1 link connection state information from the second eNB 1707, the first eNB 1705 stores the S1 link connection state between the second eNB 1707 and the first MME 1709 as a failure, and runs a timer for measuring a handover restricted time.

If the first eNB 1705 determines a different MME other than the first MME 1709 as the serving MME and receives a handover request message indicating that a handover event condition for the second eNB 1707 is satisfied in operation 1715 during the timer for measuring the handover restricted time is running, the first eNB 1705 may transmit a handover request message for the second terminal 1703 to the second eNB 1707.

On the other hand, if the first eNB 1705 determines the first MME 1709 as the serving MME and receives a handover request message indicating that a handover event condition for the second eNB 1707 is satisfied in the operation 1719 during the timer for measuring the handover restricted time is running, the first eNB 1705 does not request the handover of the terminal 1701 to the second eNB 1707.

In operation 1721, the first eNB 1705 may determine a new eNB for performing an X2 handover. Herein, the handover request message may include a measurement report message reporting that a channel state for the second eNB 1707 satisfies a handover event. Herein, the first eNB 1705 may determine a different eNB included in the measurement report message as a new target eNB for the handover of the first terminal 1701. If it is confirmed that a different neighboring eNB which satisfies the handover event condition is present other than the second eNB 1707 through the measurement report message received from the first terminal 1701, the first eNB 1705 determines the different neighboring eNB as the new target eNB on the basis of channel state information, and in operation 1723, transmits a handover request message for the first terminal 1701 to the selected eNB.

On the other hand, if the different eNB which satisfies the handover event condition is not present other than the second eNB 17017 in the measurement report message received from the first terminal 1701, since the first eNB 1705 cannot determine another new eNB, it is determined that a handover process of the first terminal 1701 has failed.

Meanwhile, upon detection of an expiry of a timer for measuring a handover restricted time in operation 1725, the first eNB 1705 may estimate that the S1 link connection state between the second eNB 1707 and the first MME 1709 has been restored. Therefore, if a message for requesting a handover to the second eNB 1707 from a terminal registered to the first MME 1709 is received after the expiry of the handover restricted time as shown in operation 1727, the first eNB 1705 may request the handover of the terminal 1701 to the second eNB 1705 in operation 1729.

According to an embodiment of the present disclosure, upon a failure of an S1 link connection between an eNB and an MME in a wireless communication system, information regarding an S1 link connection failure state is exchanged with a neighboring eNB and/or network nodes. Therefore, by restricting a handover attempt which uses an S1 link in a connection failure state during a pre-set time, or by changing a serving MME of a handover target terminal, or by changing a target eNB, a call drop rate can be decreased while improving a handover success rate.

Various embodiments and all of the functional operations of the present disclosure described in this specification may be implemented in computer software, firmware, or hardware including the structures disclosed in this specification and their structural equivalents, or in combinations of one or more of them. Further, the various embodiments of the present disclosure described in this specification may be executed by one or more computer program products, i.e., a data processing device, etc., or may be implemented in one or more modules of computer program instructions encoded on a computer readable medium for controlling an operation of this device.

The computer readable medium may be a machine-readable storage medium, a machine-readable storage substrate, a memory device, a composition of matter having an effect on a machine-readable propagated stream, or a combination of one or more of them. The term "data processing device" includes, for example, a programmable processor, a computer, or multiple processors or all nodes, devices, and machines for processing data, including the computer. The node may include, in addition to hardware, code that generates an execution environment for the computer program, e.g., code that constitutes processor firmware, a protocol stack, a database management system, an operating system, or a combination of one or more of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a base station for controlling a handover of a terminal in a wireless communication system, the method comprising:
   receiving, from a first neighboring base station, a first message indicating a link connection failure between the first neighboring base station and a first mobility management entity (MME) in response to a state of a link connection between the first neighboring base station and the first MME being changed from a connected state into a disconnected state;
   determining at least one of a second neighboring base station and a second MME in response to receiving the first message indicating the link connection failure; and
   transmitting a second message for requesting a handover to the at least one of the second neighboring base station and the second MME,
   wherein the second neighboring base station comprises a target base station which is served by the first MME, and
   wherein the second MME comprises a serving MME which serves the first neighboring base station.

2. The method of claim 1, further comprising:
   detecting a handover request event which uses the first neighboring base station as a target base station with respect to the terminal which uses the first MME as a serving MME; and
   requesting a change of the serving MME of the terminal to the second MME.

3. The method of claim 1, further comprising:
   detecting a handover request event which uses the first neighboring base station as a target base station with respect to a terminal which uses the first MME as a serving MME;
   changing the target base station of the terminal to the second neighboring base station connected to the first MME; and
   requesting a handover of the terminal to the changed second neighboring base station.

4. The method of claim 1, further comprising:
   restricting an execution of the handover based on the link connection between the first neighboring base station and the first MME,
   wherein the first message indicating the link connection failure between the first neighboring base station and the first MME includes at least one of identification information of the first neighboring base station, identification information of the first MME, identification information of an MME group to which the first MME belongs, indication information indicating an S1 link connection failure between the neighboring base station and the first MME, cause information indicating a cause of the S1 link connection failure, or handover restricted time information.

5. The method of claim 4,
   wherein the restricting of the execution of the handover based on the link connection between the first neighboring base station and the first MME comprises restricting the handover of the terminal which uses the first MME as a serving MME to the first neighboring base station during a handover restricted time, and
   wherein the restriction temporarily refuses requesting the handover using the link connection failure.

6. The method of claim 1, further comprising:
   detecting a link connection state between the first base station and at least one MME connected to the first base station; and
   upon detection of the link connection failure between the first base station and the at least one MME, transmitting, to the at least one neighboring base station, a message indicating the link connection failure between the first base station and the at least one MME.

7. The method of claim 1, wherein the message indicating the link connection failure between the first neighboring base station and the first MME is received from one of the first neighboring base station or the first MME as a response message for a handover request message of the terminal.

8. The method of claim 1, wherein transmitting a second message for requesting a handover to the at least one of the second neighboring base station and the second MME comprises:
   when determining the second neighboring base station in response to receiving the first message indicating the link connection failure, transmitting the second message for requesting the handover to the second neighboring base station; and
   when determining the second MME in response to receiving the first message indicating the link connection failure, transmitting the second message for requesting the handover to the second MME.

9. An apparatus of a base station for controlling a handover of a terminal in a wireless communication system, the apparatus comprising:
   a transceiver configured to communicate with at least one of a neighboring base station and a mobility management entity (MME); and
   at least one processor configured to:
      receive, from a first neighboring base station, a first message indicating a link connection failure between the first neighboring base station and the first MME in response to a state of a link connection between the first neighboring base station and the first MME being changed from a connected state into a disconnected state,
      determine at least one of a second neighboring base station and a second MME in response to receiving the first message indicating the link connection failure, and
      transmit a second message for requesting a handover to the at least one of the second neighboring base station and the second MME,
   wherein the second neighboring base station comprises a target base station which is served by the first MME, and
   wherein the second MME comprises a serving MME which serves the first neighboring base station.

10. The apparatus of claim 9, wherein the at least one processor is further configured to:
    detect a handover request event which uses the first neighboring base station as a target base station with respect to the terminal which uses the first MME as a serving MME, and
    request a change of the serving MME of the terminal to the second MME.

11. The apparatus of claim 9, wherein the at least one processor is further configured to:
    detect a handover request event which uses the first neighboring base station as a target base station with respect to a terminal which uses the first MME as a serving MME, change the target base station of the terminal to the second neighboring base station connected to the first MME, and request a handover of the terminal to the changed second neighboring base station.

12. The apparatus of claim 9, wherein the at least one processor is further configured to restrict an execution of the handover based on the link connection between the first neighboring base station and the first MME, and wherein the first message indicating the link connection failure between the first neighboring base station and the first MME includes at least one of identification information of the first neighboring base station, identification information of the first MME, identification information of an MME group to which the first MME belongs, indication information indicating an S1 link connection failure between the neighboring base station and the first MME, cause information indicating a cause of the S1 link connection failure, or handover restricted time information.

13. The apparatus of claim 12, wherein the at least one processor is further configured to restrict the handover of the terminal which uses the first MME as the serving MME to the first neighboring base station during a handover restricted time, and wherein the restriction temporarily refuses requesting the handover using the link connection failure.

14. The apparatus of claim 9, wherein the at least one processor is further configured to:

detect a link connection state between the first base station and at least one MME connected to the first base station, and upon detection of the link connection failure between the first base station and the at least one MME, transmit, to the at least one neighboring base station, a message indicating the link connection failure between the first base station and the at least one MME.

15. The apparatus of claim 9, wherein the message indicating the link connection failure between the first neighboring base station and the first MME is received from one of the first neighboring base station or the first MME as a response message for a handover request message of the terminal.

\* \* \* \* \*